May 1, 1934. C. F. MILLER, JR 1,957,410
GLASSWARE SHAPING APPARATUS
Filed July 8, 1930 2 Sheets-Sheet 1

Inventor
Charles F. Miller Jr.
By Emery, Booth, Varney & Holcombe
Attorneys

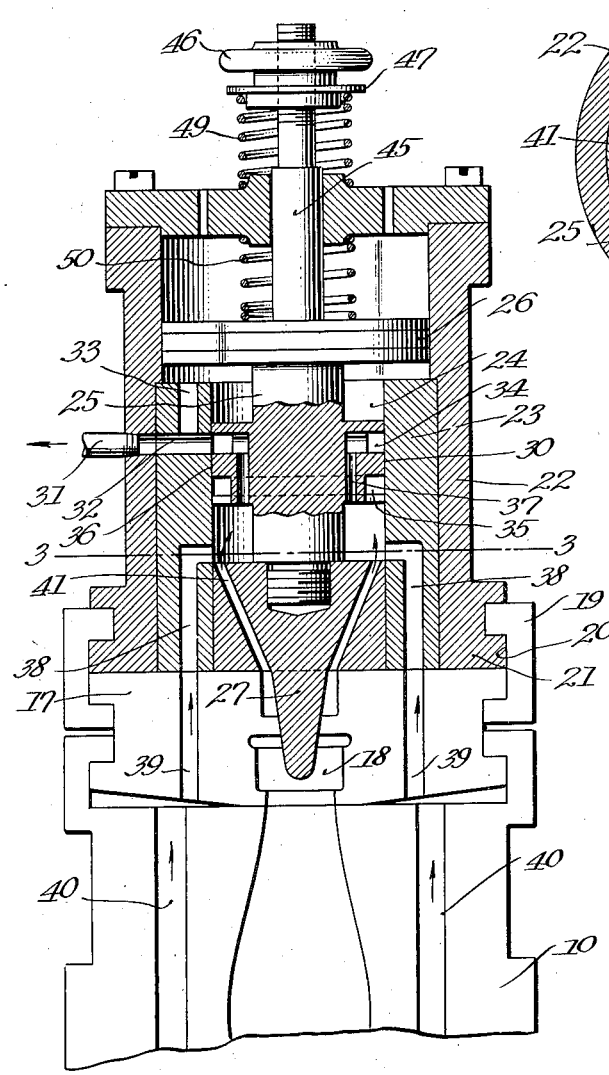

Patented May 1, 1934

1,957,410

UNITED STATES PATENT OFFICE 1,957,410

GLASSWARE SHAPING APPARATUS

Charles F. Miller, Jr., Washington, D. C., assignor to Lynch Corporation, a corporation of Indiana Application July 8, 1930, Serial No. 466,565

5 Claims. (Cl. 49—9)

The present invention relates to glassware forming apparatus and more particularly to improved apparatus for compacting the glass and shaping the parison in the manufacture of hollow glass containers, and the invention aims generally in improving existing apparatus for that purpose.

In the manufacture of hollow glass containers, the glass charge is first shaped in a parison mold, which may include a body mold and a neck mold, by first compacting the charge in the neck mold and around a mouth forming pin, so as to shape the neck and mouth finish of the article, and thereafter to admit air under pressure to the mouth end of the charge to expand the charge in the parison mold so as to blow it to hollow form of definite length to properly shape it into a parison suitable for final shaping in a finishing mold.

Advantageously the compacting of the glass charge around the mouth forming pin is initially effected by means of suction applied axially of the neck mold cavity to draw the glass down to completely fill the cavity and properly shape the neck end of the article, and also laterally throughout a substantial portion of the body mold cavity to accelerate movement of the charge therethrough. Upon completion of the application of suction the mouth forming pin is preferably withdrawn from the neck mold cavity and simultaneously therewith pressure air is admitted to expand the parison to its hollow form.

The invention aims particularly to provide novel means for controlling the position of the mouth forming pin both to move it to closed position in and withdraw it from the neck mold cavity, and automatically controlled in its proper position by the admission of suction or pressure blowing air to the mold.

One embodiment of the invention, which is selected as suitable for illustrative purposes is shown in the accompanying drawings, wherein Fig. 1 is a vertical sectional view through a parison mold and its carrying unit, of the type adapted to invert the parison preparatory to bringing it to charging position;

Fig. 2 is an enlarged vertical sectional view of the combined suction and blowing head shown associated with a neck mold and a portion of the mouth pin, showing the relative position of the parts during the application of suction to compact the charge around the mouth forming pin;

Fig. 3 is a transverse sectional view taken on the line 3—3 of Fig. 2; and

Fig. 4 is a detailed transverse sectional view of the suction and air pressure control valve as taken on the line 5—5 of Fig. 1.

Figure 1:
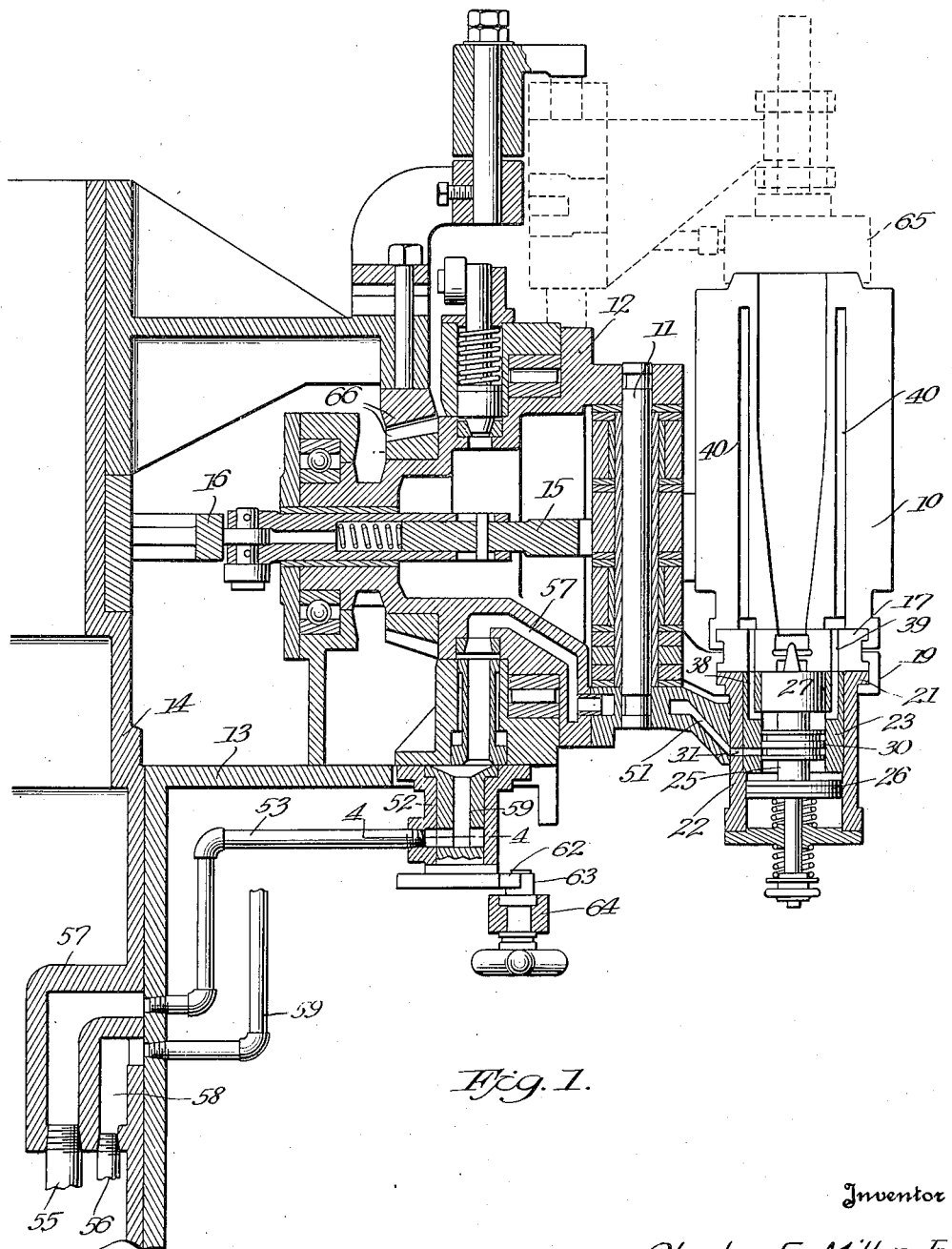

Referring to the illustrative embodiment of the invention shown in the drawings, the parison mold 10 is preferably of the well known sectional type, comprising opposed sections pivotally mounted upon a hinge pin 11 of a mold support 12, rotatably mounted upon a table or carrier 13 for rotation around a central column 14. Suitable connections 15 comprising links and yokes are provided for opening and closing said mold sections 10 as is well understood, the said connections 15 being herein shown as controlled by a cam 16, carried by the column 14 although obviously other means for the purpose may be provided.

Adjacent the neck end of the parison mold are neck mold sections 17 providing, when closed together, a neck mold cavity 18 for properly shaping the neck end of the article, and the neck mold sections 17 are preferably supported in sectional neck mold holders 19 hingedly mounted upon hinge pins 11, so that the neck molds may be moved to open and closed position as desired.

The neck mold holders 19 of each of the parison mold units may be grooved as at 20 to embrace the flanged ends 21 of a mouth forming pin plunger housing or casing 22 so as to align accurately the neck molds 17 and the mouth forming pin during the shaping of the parison in the parison mold.

Within the housing or casing 22 is a guide member 23 preferably of shorter length than the casing and having a central opening or chamber 24 for guiding a reciprocably mounted stem 25 of a piston 26 carrying a removably connected mouth forming pin 27. The mouth forming pin 27 is reciprocable within the inner portion of the opening 24 and the piston 26 is reciprocable within the enlarged outer end of the casing and is effective upon application of suction and pressure air to said casing to move the mouth pin into and out of closed position with respect to the neck mold cavity 18.

Carried by the stem 25 and reciprocable within the outer portion of the opening 24 is a valve member 30, preferably disk shaped for controlling the suction and air pressure admitted to the housing 22 through a single supply port 31, (see Figs. 1 and 2) leading to the passage 32 in the guide 23. The passage 32 opens into the chamber 24 adjacent the valve member 30 and has a branch port 33 in the outer part of the guide 23 communicating with the outer end of the casing adjacent the piston 26.

The valve member 30 may be provided with a peripheral annular suction groove 34 adjacent the outer end of the valve and a similar pressure air groove 35 adjacent the inner end of the valve providing between them an annular rim 36 adapted during normal position of the valve and mouth forming pin to close the passage 32 leading to the chamber 24. The outer suction groove 34 communicates with longitudinally extending passages 37 in the valve leading to the inner end of the chamber 24 of the guide member 23 and the inner end of the guide member 23 is also formed with longitudinally extending suction passages 38 opening laterally at their upper ends into the inner end of the chamber 24 below the valve 34 as shown in Fig. 2. These passages 38 open through the inner end of the guide member 23 where they are in communication with passages 39 extending transversely of the neck mold sections and which in turn communicate with cored passages 40 in the mating walls of the parison mold throughout a substantial length thereof as is well understood in the art.

Thus, when suction is applied in port 31 and the valve member in its normal position with the annular rim 36 closing the passage 32, the suction is first effective through branch port 33 into the upper end of the casing 22 acting upon piston 26 to move inwardly the piston and the mouth forming pin 27 to closed position in the neck mold cavity 18. This movement of the piston and stem 25 moves the valve member 30 inwardly until the suction groove 34 is in alignment with the passage 32 when the suction will be admitted through groove 34, passages 37 to the inner end of the chamber 24 and thence through suction passages 38 and 39 to cored passage 40 in the parison mold for applying suction laterally in the parison mold throughout a substantial portion of its length. Suction is also applied in the neck mold cavity by means of passages 41 in the mouth forming pin leading from the chamber 24 below the valve, to the neck mold cavity so that the effect of suction may be applied both laterally in the parison mold cavity and axially in the neck mold cavity quickly to draw the glass charge into the neck end of the mold and compact it around the mouth forming pin as is desirable in the art.

When air pressure is admitted to the port 31, it is effective at first against the piston 26 to move the piston outwardly in the casing 22, withdrawing the mouth forming pin sufficiently to close the ports 38 and simultaneously move the valve to a position where the annular air pressure groove 35 is in communication with the passage 32, thus permitting air pressure to pass from groove 35 through the inner end of chamber 24 through passages 41 to the neck mold cavity while excluding pressure air from the cored passages 40 in the parison mold.

As explained above, the valve 30 and its stem 25 are normally positioned so that the annular rim 36 of the valve closes the outlet of passage 32 in which position the mouth forming pin is withdrawn from the neck mold cavity sufficiently to permit the opening of the neck molds and the transfer of the parison to the blow or finishing molds, as is understood. This normal positioning of the valve and mouth pin may be maintained by means of a stem 45 on the outer end of the piston extending loosely through the outer end of the casing 22 and having adjustably threaded thereon an adjusting nut 46 carrying a plate 47 adapted to engage a coil spring 49 interposed between the plate and the outer end of the housing. In some instances, as for example, when the invention is used in a machine of the gob fed type, wherein the parison mold is inverted and the mouth forming pin is lowermost at the charging station, a second spring 50 may be interposed between the piston 26 and the inner side of the casing end advantageously to maintain the valve and mouth forming pin in its normal position.

My improved apparatus for shaping the parison is advantageously embodied in a glassware forming machine of the rotary type, particularly such a machine as embodying a circular series of molds mounted upon a rotatable support to be moved in succession to and opposite a gathering or charging position. In such machines it is desirable that suction be applied slightly in advance of moving the mold into charging position which is advantageously accomplished by providing a cored passage 51 in the mold support, said passage communicating with port 31 in the casing 22. Suction and pressure air may be alternately admitted to the passage 51 by suitable valve means 52 connected to separate suction and air pressure lines 53 and 54 which in turn are connected to suitable sources of suction 55 and pressure air 56 by stationary valve ports 57 and 58 respectively, on the central column.

The valve 52 may be of any suitable design for the purpose described but I find that a rotary distributing valve (as shown in Figs. 1 and 4) is admirably suited, which may comprise a valve casing 52 and a rotary valve stem 59 having lateral inlets 60 disposed 90° apart, each communicating with a single axial outlet 61. The stem 59 carries a series of fingers 62 preferably disposed 45° apart and adapted to engage each of a series of rollers 63 supported as at 64 and properly spaced apart so as to actuate the valve 52 at proper times in the rotation of the mold carrier. The suction and air lines 53 and 54 are connected to inlet ports in the valve casing 52 preferably spaced 45° apart (see Fig. 4) so that periodic rotation of the valve stem 45° will alternately bring the inlet ports of the valve stem into communication with the suction and pressure air lines 53 and 54.

From the above it will be apparent as the mold carrier 13 is rotated to bring any one of a series of parison molds into charging position, the suction line 53 is brought into communication with the supply port 57 to apply suction to the neck mold cavity, the valve 52 having just been moved to a position to align one of the inlet ports of its stem with the suction line 53 as shown in Fig. 4. Suction is thus applied through line 51 to port 31 and becomes immediately effective through port 33 upon the inner face of the piston 26 to move the mouth forming pin to closed position and the valve 30 into position to establish communication between the line 31 and the inner end of the chamber 24 of the guide 23, thus establishing suction communication through passages 38, 39 and 40 to the parison mold cavity and through passages 41 to the neck mold cavity. This suction, effective in the parison mold, is sufficient to effect gathering of the charge of glass either by sucking it from the tank of molten glass or receiving it from a mechanical feeding device and after the charging is completed, the suction may be maintained sufficiently long to properly compact the charge around the mouth forming pin as predetermined by a definite portion of mold travel. When such definite portion of mold travel has been completed, the valve is rotated an additional 45° by contact with one of the fingers 62 with the first stop roller 63, thus cutting off the flow of suction to the mold and establishing pressure air communication from line 54 therewith. A reversal of air in the line 51 from suction to air pressure is effected first against the inner face of the piston to move it outwardly in its casing to withdraw the mouth pin 27 and then establish communication between the passage 32 and the air pressure groove 35 in the valve 30 to the inner end of chamber 24, through passages 41 to the neck mold cavity, thus to blow the parison to hollow form while confined therein by a suitable closure 65. In this position the mouth pin has been fully withdrawn to such an extent that it covers the suction ports or passages 38 leading to the cored passages 40 in the parison mold and thus preventing the application of pressure air in the parison mold during the blowing of the parison to hollow form. After the parison has been blown sufficiently as determined by mold travel, the fingers 62 of the valve 52 strike a second roller 63 which rotates the valve stem an additional 45°, bringing the inlet port into alignment with suction line 53 and cutting off pressure air from line 54. However, at this time no suction will flow to the mold because the mold is beyond the circumferential range of the supply port 57. The suction supply port 57 may be of sufficient range to admit suction to the mold considerably in advance of their coming to the charging station so as to permit cooling of the mold.

Obviously my invention is adaptable for use either with machines which gather their charges of glass by suction, in which case the mold mounting 12 and cored passages 51 may be substantially as disclosed in the copending application of Edward G. Bridges, Serial No. 408,890, filed November 21, 1929, for use with machines of the gob fed type as disclosed in Fig. 1 wherein the mold support is journalled in bearings for rotation about a horizontal axis by means of gearing 66 after the shaping of the parison as is well understood in the art.

Advantages of my invention reside in the simplicity of construction and control permitting a quick and accurate movement of the mouth forming pin to its proper position for proper fabrication of the glass in the mold and without the necessity of separate cam or other actuating means therefor.

My invention is not to be restricted to the details of construction as shown and described herein but extends to the equivalents thereof as well.

I claim:

1. A combined suction and blowing head for use with a glass shaping mold having a shaping cavity and longitudinal passages therein communicating with said cavity throughout a substantial portion of its length, said head comprising a casing, a mouth forming pin movable therein, a piston associated with said mouth pin and effective upon application of suction to said casing to move said mouth pin into closed position with respect to said mold, and valve means controlled by the movement of said piston for applying suction to the mouth cavity and longitudinal passage of said mold after the mouth pin has been moved into its closed position.

2. A combined suction and blowing head for use with a glass shaping mold having a shaping cavity and longitudinal passages therein communicating with said cavity throughout a substantial portion of its length, said head comprising a casing, means for alternately admitting suction and pressure air to said casing, a mouth pin movable in said casing, a piston associated with said mouth pin and effective upon admission of suction and pressure air to said casing respectively to move said mouth pin into and out of closed position with respect to said mold, and valve means connected with said mouth pin and operative to apply suction to said mold cavity and longitudinal passages as said pin is moved to closed position in said mold and to admit pressure air only to the mouth end of said mold cavity as the mouth pin is retracted therefrom.

3. A combined suction and blowing head for use with a glass shaping mold having a shaping cavity and longitudinal passages therein communicating with said cavity throughout a substantial portion of its length, said head comprising a casing, a mouth forming pin movable therein, a piston associated with said mouth pin and effective upon admission of suction to said casing to move said mouth pin into closed position with respect to said mold, and valve means carried by said mouth pin for applying suction to the mouth cavity and longitudinal passages of said mold after the mouth pin has been moved into closed position.

4. A combined suction and blowing head for use with a glass shaping mold having a shaping cavity and longitudinal passages therein communicating with said cavity throughout a substantial portion of its length, said head comprising a casing, means for alternately admitting suction and pressure air to said casing, a piston associated with said mouth pin and effective upon admission of suction and pressure air to said casing respectively to move said mouth pin into and out of closed position with respect to said mold, and valve means carried by said piston and operative to apply suction to said mold cavity and to admit pressure air only to the mouth end of said mold cavity as the mouth pin is retracted therefrom.

5. In a glassware forming machine comprising a parison mold and mouth forming pin mechanism arranged to close the mouth end of the parison mold as the charges are packed therein, said parison mold being provided with suction passages communicating laterally with the body cavity throughout a substantial portion of the length thereof and said mouth pin mechanism adapted to apply suction axially to the neck end of said parison mold cavity; said mouth forming pin mechanism including a casing, a piston head connected with said mouth forming pin but movable in said casing, means for alternately supplying suction and pressure air to said casing, means associated with said mouth pin and suction and pressure air supply for controlling the application of suction first against said piston to move the mouth pin to close the mouth opening of said mold and operative upon such closing movement to render said suction effective through said passages to the neck end and parison mold cavity of said mold.

CHARLES F. MILLER, Jr.